United States Patent
Ferrand et al.

(10) Patent No.: US 7,421,595 B2
(45) Date of Patent: Sep. 2, 2008

(54) DEVICE AND METHOD FOR MANAGING A STANDBY STATE OF A MICROPROCESSOR

(75) Inventors: Olivier Ferrand, Carry le Rouet (FR); Jean-Michel Gril-Maffre, Aix-en-Provence (FR)

(73) Assignee: STMicroelectronics S.A., Montrouge (FR)

( * ) Notice: Subject to any disclaimer, the term of this patent is extended or adjusted under 35 U.S.C. 154(b) by 424 days.

(21) Appl. No.: 11/083,111

(22) Filed: Mar. 17, 2005

(65) Prior Publication Data

US 2005/0216778 A1    Sep. 29, 2005

(30) Foreign Application Priority Data

Mar. 18, 2004  (FR)  ................... 04 02816

(51) Int. Cl.
*G06F 1/00* (2006.01)
*G06F 1/26* (2006.01)

(52) U.S. Cl. .................... 713/300; 713/320
(58) Field of Classification Search .......... 713/300
See application file for complete search history.

(56) References Cited

U.S. PATENT DOCUMENTS

| | | | |
|---|---|---|---|
| 3,577,190 A | 5/1971 | Cocke et al. | |
| 4,482,983 A * | 11/1984 | Slechta, Jr. ................ | 713/502 |
| 4,484,303 A | 11/1984 | Provanzano et al. | |
| 4,803,620 A | 2/1989 | Inagami et al. | |
| 5,446,904 A | 8/1995 | Belt et al. | |
| 5,579,498 A | 11/1996 | Ooi | |
| 5,584,031 A | 12/1996 | Burch et al. | |
| 5,781,750 A | 7/1998 | Blomgren et al. | |
| 5,805,491 A | 9/1998 | Bechade | |
| 5,805,850 A | 9/1998 | Luick | |
| 5,974,240 A | 10/1999 | Chan | |
| 6,052,776 A | 4/2000 | Miki et al. | |
| 6,116,768 A | 9/2000 | Guttag et al. | |
| 6,125,449 A | 9/2000 | Taylor et al. | |
| 6,505,313 B1 | 1/2003 | Phan et al. | |
| 6,535,982 B1 | 3/2003 | Kawabe et al. | |
| 6,901,503 B2 | 5/2005 | Barlow et al. | |

(Continued)

FOREIGN PATENT DOCUMENTS

EP    0 827 071    3/1998

(Continued)

OTHER PUBLICATIONS

Preliminary French Search Report, FR 04 02816, Oct. 27, 2004.

(Continued)

*Primary Examiner*—Rehana Perveen
*Assistant Examiner*—Stefan Stoynov
(74) *Attorney, Agent, or Firm*—Gardere Wynne Sewell LLP

(57) ABSTRACT

A microprocessor includes a computation unit having logic units for executing operations associated with determined instructions of a microprocessor instruction set and a control unit for interpreting the instructions and for controlling the logic units accordingly. An internal timer of the microprocessor is activated by the control unit in response to the execution of a dedicated standby instruction of the microprocessor instruction set. Responsive thereto, a timeout signal is delivered to the control unit so as to place the microprocessor in a standby state during a determined timeout period.

24 Claims, 3 Drawing Sheets

U.S. PATENT DOCUMENTS

| | | |
|---|---|---|
| 7,191,350 B2 | 3/2007 | Tani et al. |
| 7,197,655 B2 * | 3/2007 | Flachs et al. ................ 713/324 |
| 2003/0070013 A1 * | 4/2003 | Hansson ...................... 710/59 |
| 2003/0095606 A1 | 5/2003 | Horowitz et al. |
| 2004/0006687 A1 | 1/2004 | Yoshida |
| 2004/0059899 A1 | 3/2004 | Luick |
| 2004/0268091 A1 * | 12/2004 | Pessolano ................... 712/215 |

FOREIGN PATENT DOCUMENTS

| | | |
|---|---|---|
| WO | WO 02/077799 | 10/2002 |

OTHER PUBLICATIONS

Shibasaki, et al., "High-Performance Single-Chip Microcontroller H8/300 Series," Hitachi Review, vol. 40, No. 1, pp. 23-28, Feb. 1, 1991, XP000238813.

* cited by examiner

DEVICE AND METHOD FOR MANAGING A STANDBY STATE OF A MICROPROCESSOR

PRIORITY CLAIM

This application claims priority from French Application for Patent No. 04 02816 filed Mar. 18, 2004, the disclosure of which is hereby incorporated by reference.

BACKGROUND OF THE INVENTION

1. Technical Field of the Invention

The present invention relates in a general manner to the management of a standby state of a microprocessor. The invention relates more particularly to a microprocessor and to a method of control of such a microprocessor to place it in a standby state during a determined period.

2. Description of Related Art

It is known that in microprocessor systems the data transfer speed may differ from one peripheral to another. Such peripherals are by way of example memories of different architecture whose data transfer rates are different.

Thus, when the processing of an instruction is dependent on the result of a previously processed instruction, and if the instructions call upon information stored in memories of different architecture, data congestion may appear at the microprocessor. For example, the second instruction may need an address computed by the first instruction.

It is therefore necessary to synchronize the transfer of data, hence the processing of the instructions, at the microprocessor which executes operations associated with the instructions.

To avoid this data congestion, one solution is to deliberately slow down the processing of one or more instructions. For example, the solution consists in inserting a standby state of a determined number of clock cycles between the processing of the instructions concerned. The microprocessor is thus in a standby state. Stated otherwise, a standby state is generated so as to tailor transfer times during communications between several peripherals managed by the microprocessor or to sharpen the execution time of a program of any application.

Several procedures are known in prior art for generating a standby state during a determined period corresponding to a determined number of clock cycles.

A first procedure known in the state of the art consists in providing for the implementation, in a program, of an NOP instruction (standing for "No Operation") belonging to an instruction set of the microprocessor. The function of the NOP instruction is conventionally to generate a standby state during a period equal to one clock cycle.

Each instruction is processed during a period equal to a cycle, the so-called instruction cycle, which may be broken down into a cycle of searching for an instruction, a cycle of decoding the instruction, a cycle of executing the decoded instruction and a cycle of writing the result of the instruction.

Thus, if one wishes to generate a standby state during a period corresponding to N clock cycles of the microprocessor, the microprocessor is controlled according to N consecutive NOP instructions (see, FIG. 3).

Now, the implementation of these N instructions is on the one hand very expensive in terms of memory space (a memory space storing the program of the application) and monopolizes N instruction cycles to process the N NOP instructions. Moreover, with the microprocessor working for N instruction cycles, this also affects the energy consumption of the microprocessor. Specifically, the integrated circuits of the microprocessor are always active and are invoked to execute the instructions implementing the standby state, hence needless energy consumption. Indeed, the integrated circuits consume as much energy as during the execution of "useful" instructions of a program while they are carrying out no particular operation except the generation of a standby state. Moreover, it is known that the consumption of energy accelerates the deterioration of the integrated circuits on account of the increase in the resulting temperature in said circuits.

Thus, the processing time for the NOP instructions is long, expensive in terms of holding of memory space storing the program, so that such implementation is therefore hardly favorable for generating a standby state corresponding to a very significant number N of clock cycles.

Another procedure known from the prior (see, FIG. 4) proposes the implementation of a software loop comprising the aforesaid NOP instruction, and the number of iterations of which is dependent on the period of the standby state that one wishes to generate. This procedure is advantageous when N is large since it is less expensive in terms of memory space storing the program of the application.

A drawback of this procedure lies however in the implementation of the software loop which requires four instructions and, consequently, four instruction cycles of the microprocessor for the processing of one iteration of the loop (to be multiplied by the number of iterations of the loop).

Another drawback of this procedure is that the implementation also requires a counting register.

In another procedure known from the prior art (see, FIG. 5), it is also possible to program a counter external to the microprocessor. Several instructions are nevertheless necessary to program the period, then count and finally monitor the end of the count. Moreover, such a solution requires the addition of hard-wired logic components to produce a counter, this entailing extra manufacturing costs.

A last procedure known from the prior art proposes that an interrupt or an outside event be waited for on standby, in which case the period of the standby state is not determined since it depends on the moment at which the said interrupt or said outside event occurs.

However, this procedure makes it necessary to store in an external memory the address for resuming the execution of the program of the application. Moreover, it is rather inaccurate as regards the moment at which the standby state has to trigger and as regards the actual period of this standby state. This solution is therefore suitable for generating very long standby states in systems that do not require great accuracy. This procedure is not suitable however for certain computing or telecommunication systems whose applications are very sensitive to execution time (real-time applications, for example).

Finally, a drawback common to all the procedures known from the art is that when one wishes to modify the period of the standby state, the reprogramming is often tiresome and complex. This is generally true during the development phases of telecommunication or computing systems where the transfer rates have to be tailored via a standby state of a determined number of clock cycles. The development phase is yet more tedious.

SUMMARY OF THE INVENTION

In order to remedy these drawbacks, an embodiment of the present invention proposes that a standby state be generated during a determined period typically corresponding to a determined number of clock cycles through the execution of a single instruction, the so-called standby instruction, while avoiding to the maximum the invoking of the integrated circuits which make up the microprocessor during this standby state.

An embodiment of the invention thus relates to a microprocessor comprising a computation unit which includes logic units for executing operations associated with determined instructions of a microprocessor instruction set and a control unit for interpreting the instructions and for controlling the logic units accordingly. The microprocessor further comprises an internal timer which is activated by the control unit in response to the execution of a dedicated instruction of the microprocessor instruction set, the so-called standby instruction, and which delivers a timeout signal delivered to the control unit so as to place the microprocessor in a standby state during a determined timeout period. The implementation of such an instruction considerably reduces the memory allocated for the program processed by the microprocessor.

To place the microprocessor in the standby state, the control unit generates a blocking signal for interrupting and blocking the processing of the instructions during the timeout period. Thus, the processing of the instructions being blocked, the logic units which in normal time execute operations associated with respective instructions are no longer invoked during the timeout period and hence are in a low energy consumption idle state.

According to an advantageous characteristic of the invention, the internal timer may be programmable, the timeout period being dependent on a value specified as parameter of the standby instruction. The timeout period corresponds to a determined number of clock cycles of the microprocessor. The program for implementing a standby state of several clock cycles is thus greatly reduced since a single dedicated instruction of the microprocessor instruction set is required, and gains in terms of flexibility of use in case of modification of the timeout period.

In one embodiment, the control unit includes a retrieve unit for retrieving instructions to be executed which are stored in a program memory and a sequencer which receives the timeout signal. In response to the timeout signal, the sequencer can deliver the blocking signal on an input for activating and deactivating the fetch unit so as to interrupt and block the retrieval of the instructions.

The control unit can further comprise a decoding unit for decoding instructions to be executed. Thus, the sequencer can deliver the blocking signal on an input for activating and deactivating said decoding unit so as to interrupt and block the decoding of the instructions.

In general, the control unit also includes an instruction register for storing an instruction to be executed. In this case, the sequencer can also deliver the blocking signal on an input for activating and deactivating the instruction register so as to interrupt and block the storage of instructions to be executed.

The control unit can also comprise an ordinal counter which stores the address of a future instruction to be executed. In this case, the sequencer can deliver the blocking signal on an input for activating and deactivating the counter so as to interrupt and block the address storage in the counter.

Advantageously, the microprocessor exhibits a pipeline architecture and/or an RISC architecture.

The invention also proposes a method of managing a standby state of a microprocessor comprising a computation unit which includes logic units for executing operations associated with instructions belonging to a microprocessor instruction set and a control unit for interpreting the instructions and for controlling the logic units accordingly. Such a method comprises the following steps:

the control unit activates a timer internal to the microprocessor in response to the execution of a dedicated instruction of the microprocessor, the so-called standby instruction;

the timer delivers a timeout signal which is delivered to the control unit; and the control unit delivers a blocking signal to interrupt and block the processing of the instructions so as to place the microprocessor in the standby state during a timeout period.

According to an advantageous characteristic of the invention, an optional parameterization makes it possible to adjust the timeout period, said period being a value specified as parameter of the standby instruction.

In one mode of implementation, the control unit comprises a sequencer which receives the timeout signal and units for processing instructions including at least one fetch unit for retrieving from a program memory instructions to be executed. In response to the timeout signal, the sequencer delivers the blocking signal on an input for activating and deactivating said fetch unit so as to interrupt and block the retrieval of the instructions during the timeout period.

In general, the control unit can also comprise at least one decoding unit for decoding instructions to be executed. In response to the timeout signal, the sequencer can deliver the blocking signal on an input for activating and deactivating said fetch unit so as to interrupt and block the retrieval of the instructions during the timeout period.

The control unit comprises at least one instruction register which stores instructions to be executed. In response to the timeout signal, the sequencer can deliver the blocking signal on an input for activating and deactivating said instruction register so as to interrupt and block the storage of the instructions in said register during the timeout period.

The control unit comprises at least one ordinal counter which stores the address of the next instruction to be executed. In response to the timeout signal, the sequencer can deliver the blocking signal on an input for activating and deactivating said counter so as to interrupt and block the address storage during the timeout period.

In accordance with an embodiment of the invention, an apparatus comprises a computation unit for a microprocessor and a timer for counting a standby time period and activating during that period a time out signal. A control unit is operable responsive to execution of a standby instruction within an instruction set of the microprocessor to actuate the timer, and is further operable responsive to the time out signal to interrupt and block processing of program instructions by the computation unit.

In accordance with another embodiment of the invention, a method comprises executing a standby instruction of an instruction set for a microprocessor; responsive thereto, timing a standby time period and asserting a time out signal during that period; interpreting program instructions and controlling operation of a computation unit for the microprocessor according to program instructions if the time out signal is not asserted; and interrupting and blocking processing of the program instructions if the time out signal is asserted

BRIEF DESCRIPTION OF THE DRAWINGS

Other characteristics and advantages of the invention will become further apparent on reading the description which follows. The latter is purely illustrative and should be read in conjunction with the appended drawings, in which.

DETAILED DESCRIPTION OF THE DRAWINGS

Figure 1:
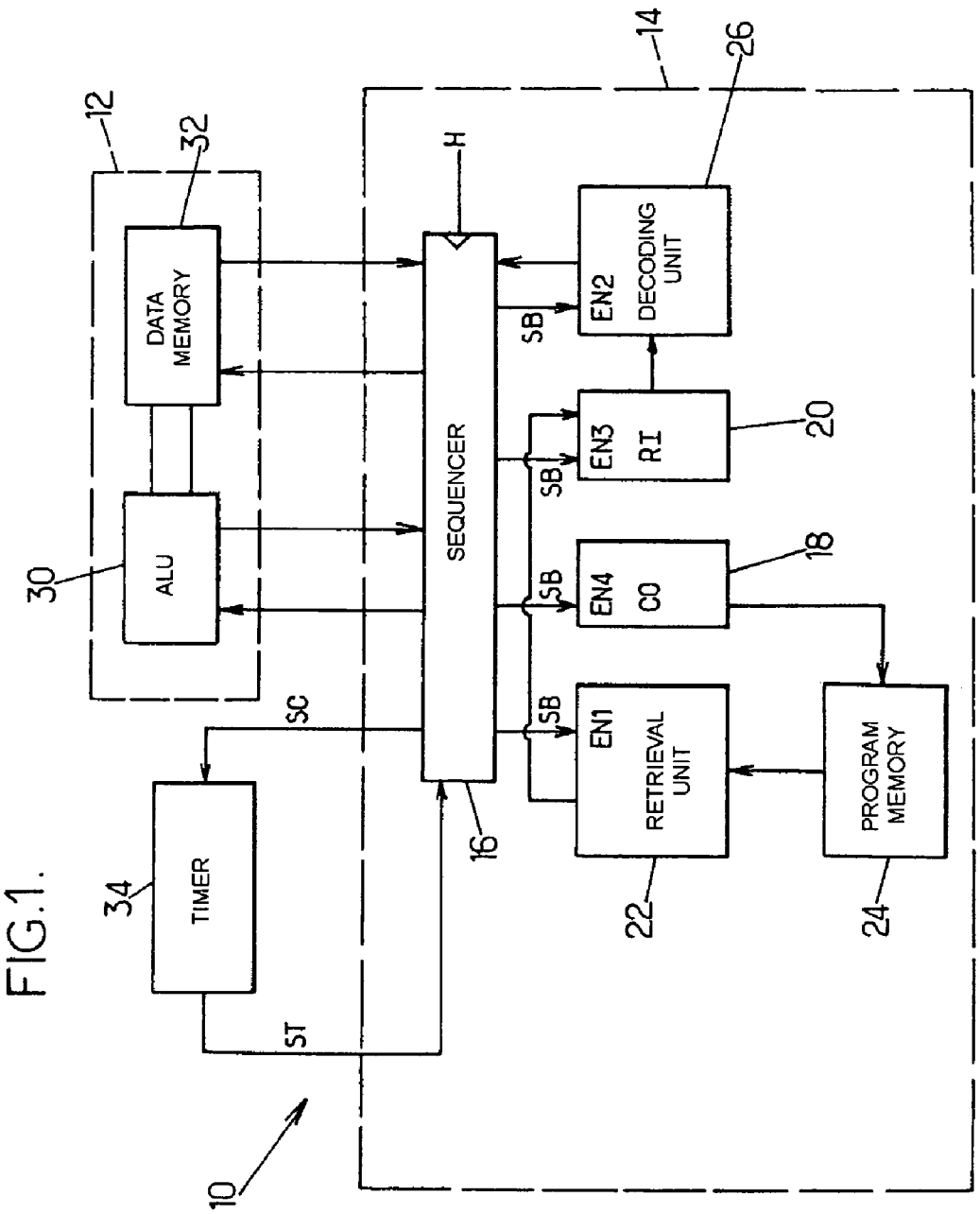
FIG. 1 is a functional diagram illustrating an embodiment of the microprocessor according to the invention.

FIG. 1 illustrates an embodiment of a microprocessor 10 according to the invention.

The microprocessor 10 comprises a computation unit 12 (or execution unit) for executing operations associated with instructions belonging to a set of once decoded instructions, and a control unit 14 for interpreting the instructions and controlling the computation unit accordingly, in tempo with clock cycles H.

The computation unit 12 comprises in particular:

an arithmetic and logic unit 30 (ALU) for performing elementary operations such as additions, multiplications or the like and which comprises logic units associated with the elementary operations such as adders, multipliers or the like; and a data memory 32, comprising memories and/or registers, which stores data specific to the various operations.

The control unit 14 comprises units for processing the instructions in particular:

a sequencer 16 which generates in tempo with the cycles of a clock signal H control signals delivered to the various logic units of the computation unit 14 which participate in the execution of a given instruction;

an ordinal counter 18 (OC) which is a register storing the address of the next instruction to be executed;

an instruction register 20 (IR) which receives the instruction to be executed;

a fetch unit 22 which retrieves an instruction of a code to be executed from a program memory 24 such as for example a memory of ROM (Read Only Memory) type, EPROM flash (Erasable Programmable Read/Only Memory) or EEPROM (Electrical EPROM) type; and a decoding unit 26 which decodes and interprets the instruction to be executed, and which determines the elementary operations to be performed and the operands.

The control unit 14 has the function of interpreting the instructions and of controlling the various logic units of the computation unit 12 accordingly. In a more detailed manner it serves in particular to:

address the next instruction in program memory;

decode the next instruction once it is loaded into the instruction register 20;

search for the data to be processed, in the program memory 24 and/or in the data memory 32;

deliver the data as input to the computation unit 12;

indicate the operation that the computation unit 12 is to perform; and possibly transfer the result(s) of the operation to the data memory 32.

Figure 6:
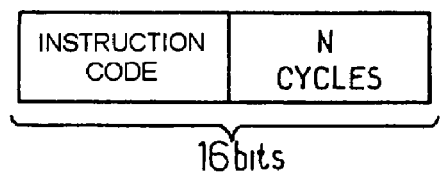
FIG. 6 illustrates an exemplary coding format of a standby instruction according to the invention.

The microprocessor 10 comprises an internal and preferably programmable timer 34. It may, for example, be a counter made by means of JK flip-flops. The timer 34 is controlled by a control signal CS generated by the sequencer 16 in response to the execution of a single dedicated instruction of the microprocessor 10 instruction set, the so-called standby instruction. The timeout period is dependent on a parameter specified as parameter of the standby instruction. As illustrated in FIG. 6, the standby instruction then comprises a first field containing the code of the instruction and a second field containing the value of the timeout period.

As a variant, the timeout period can be fixed, equal to a determined number N of clock cycles, with N strictly greater than unity.

Once the timer has been controlled, it sends a timeout signal TS to the sequencer 16 which sends a blocking signal BS to the fetch unit 22. For example, the blocking signal BS is delivered on an activating and deactivating input EN1, the so-called "ENABLE input", of the fetch unit 22 so that said unit is deactivated in order to interrupt the retrieval of the instructions from the program memory 24.

Thus, no instruction is retrieved and is therefore not decoded during the timeout period. The sequencer 16 no longer delivers any control signals to the computation unit 12, the microprocessor 10 is in a standby state during a determined period corresponding to a determined number of clock cycles. Generally, one speaks of the "freezing" of the microprocessor to designate such a standby state.

Moreover, the computation unit 12, no longer being controlled during the standby state, it is in a passive state (or idle state) in which it consumes very little power since the logic units that it contains are not executing any elementary operations.

As a variant, the blocking signal BS is delivered on an activating and deactivating input EN2, the so-called "ENABLE input", of the decoding unit 26 which, accordingly, is deactivated and no longer decodes any instructions.

In another variant, the blocking signal BS is delivered on an activating and deactivating input EN3, the so-called "ENABLE input", of the instruction register 20 which, accordingly, is deactivated and no longer restores the instructions to be executed.

In another variant, the blocking signal BS is delivered on an activating and deactivating input EN4, the so-called "ENABLE input", of the ordinal counter 18 which, accordingly, is deactivated and no longer stores the addresses of the instructions to be executed.

The results are identical regardless of the variant embodiment implemented, the interruption and the blocking of the processing of the instructions being carried out simply in a different and/or complementary manner.

An application of the invention relates to microprocessors exhibiting an RISC architecture and consequently a pipeline architecture where the optimization of the code is an essential factor for good performance. In such an application, the generation of a standby state of several clock cycles via the execution of a single standby instruction is particularly advantageous.

In what was described above, an instruction is processed according to a cycle of instructions which comprises inter alia a search cycle, a decoding cycle, an execution cycle and a write cycle, each of these four cycles being performed in a respective clock cycle. Thus, an instruction is processed, in a conventional microprocessor, according to four clock cycles.

The pipeline architecture makes it possible to process several instructions simultaneously. For example, it begins the execution of an instruction without waiting for the end of the previous one. In particular, an instruction is applied as input to the computation unit, while a second is decoded and a third is retrieved from an external memory. Consequently, the processing period for an instruction can be just one clock cycle.

For this application, the timer 34 delivers a timeout signal TS to the sequencer 16 which then delivers a blocking signal BS to a unit of the pipeline architecture such as a fetch unit 22 or a decoding unit 26. The processing of the instructions is thus interrupted and blocked as described above. The microprocessor 10 is then in a standby state during a determined period corresponding to a determined number of clock cycles. One also speaks of the "freezing" of the microprocessor or the "freezing" of the pipeline.

Moreover, the invention applies also to microprocessors of 8 bits, 16 bits, 32 bits or more which respectively process instructions of 8 bits, 16 bits, 32 bits or more, the size in terms of number of bits of the instruction not influencing the implementation of the method.

Figure 2:
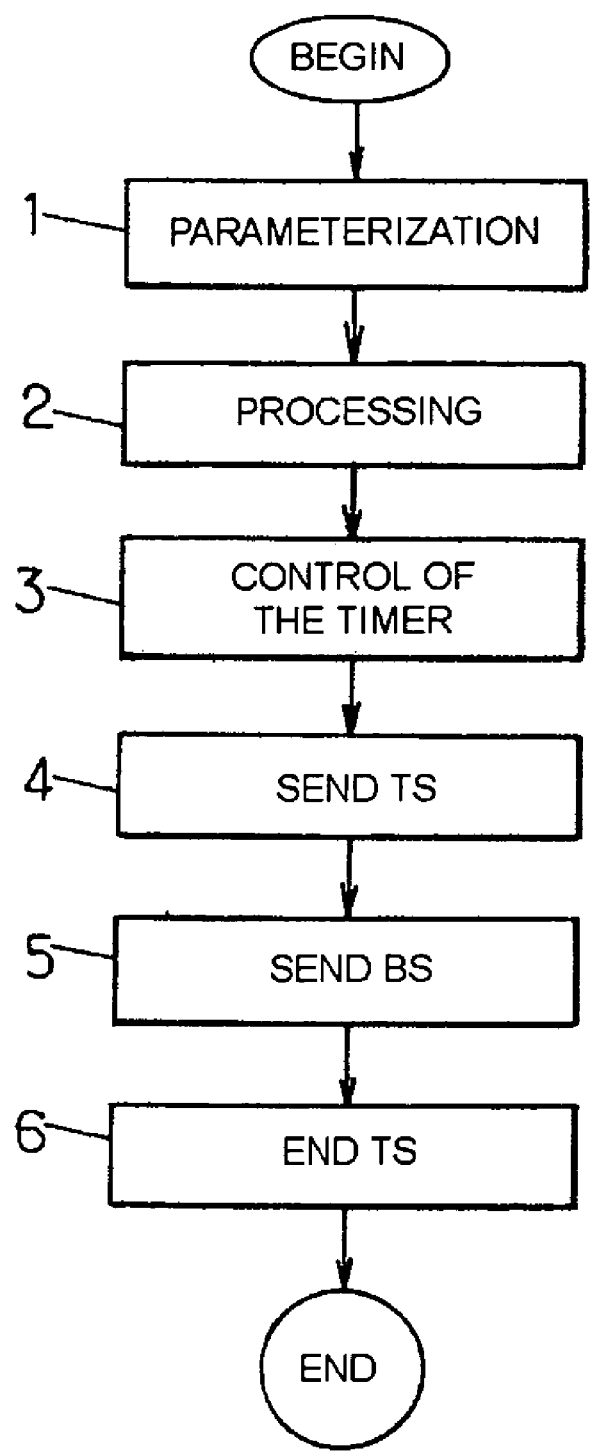
FIG. 2 is a flowchart illustrating a mode of implementation of the method according to the invention.
Figure 3:
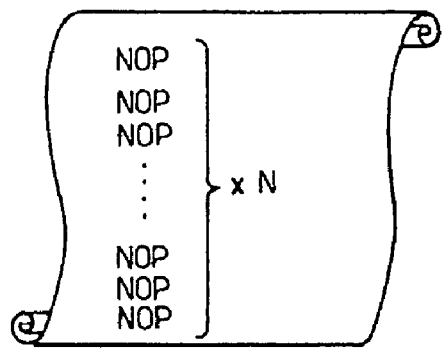
FIG. 3 illustrates an example of a portion of program for generating a standby state of N clock cycles with the aid of NOP instructions according to a procedure known from the state of the art.
Figure 4:
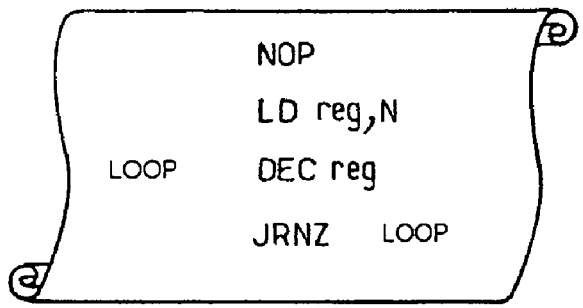
FIG. 4 illustrates another example of a portion of program for generating a standby state of N clock cycles with the aid of a software loop comprising the NOP instruction according to another procedure known from the state of the art.
Figure 5:
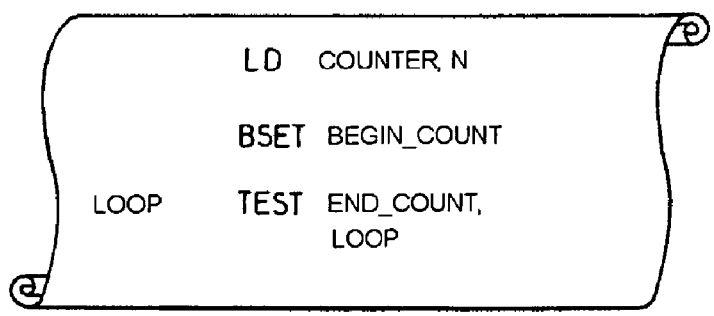
FIG. 5 illustrates another example of a program portion for generating a standby state of N clock cycles with the aid of a counter external to the microprocessor according to a procedure known from the state of the art.

FIG. 2 illustrates, in the form of a flowchart, the steps of an exemplary method for managing a standby state of a microprocessor according to the present invention.

The method comprises an optional parameterization step 1 for parameterizing the period of the standby state to be generated, that is to say, for example, setting as a parameter the number of clock cycles of the standby state. This step is of course carried out during the phase of development of the application code which is intended to be executed in the microprocessor 10. The period is adjusted according to a value specified as the parameter of the standby instruction. For example, for a standby instruction referenced WAIT in the code and for a period of 8 clock cycles, we write "WAIT 8" in the listing of the code.

In processing step 2, the standby instruction is processed according to the instruction cycle already described above.

In step 3, the sequencer 16 controls the timer 34 which is thus activated and which delivers in step 4 a timeout signal TS which is delivered to the sequencer 16.

In step 5, the sequencer 16 interrupts and temporarily blocks the processing of the instructions in response to the timeout signal TS. For this purpose, the sequencer 16 delivers a blocking signal BS to the fetch unit 22 and/or to the decoding unit 26 and/or the instruction register 20 and/or the ordinal counter 18 as stated above. The microprocessor 10 is thus in a standby state during a determined period.

As long as the timer 34 delivers the timeout signal TS to the sequencer 16, the sequencer blocks the processing of the instructions.

When the timeout period has elapsed, in step 6, the sequencer 16 no longer delivers any blocking signal BS and in parallel therewith deactivates the timer 34. The processing of the instructions resumes its normal course and the microprocessor exits the standby state.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A microprocessor, comprising:
a computation unit which includes logic units for executing operations associated with instructions of a microprocessor instruction set;
a control unit for interpreting the instructions and for controlling the logic units accordingly; and
an internal timer which is activated by the control unit in response to the execution of a dedicated standby instruction of the microprocessor instruction set and which delivers a timeout signal to the control unit so as to place the computation unit of the microprocessor in an idle state during a timeout period;
wherein the control unit includes an instruction register for storing an instruction to be executed and a sequencer which receives the timeout signal and which delivers a blocking signal on an enable input for activating and deactivating the instruction register so as to interrupt and block the storage of instructions to be executed.

2. The microprocessor according to claim 1, wherein the sequencer of the control unit generates a blocking signal for interrupting and blocking the processing of the instructions by the computation unit during the timeout period.

3. The microprocessor according to claim 1, wherein the internal timer is programmable, the timeout period being dependent on a value specified as parameter of the standby instruction.

4. The microprocessor according to claim 3, wherein the timeout period corresponds to a number of clock cycles of the microprocessor.

5. The microprocessor according to claim 1, wherein the microprocessor exhibits a pipeline architecture.

6. The microprocessor according to claim 1, wherein the microprocessor exhibits an RISC architecture.

7. A microprocessor, comprising:
a computation unit which includes logic units for executing operations associated with instructions of a microprocessor instruction set;
a control unit for interpreting the instructions and for controlling the logic units accordingly; and
an internal timer which is activated by the control unit in response to the execution of a dedicated standby instruction of the microprocessor instruction set and which delivers a timeout signal to the control unit so as to place the computation unit of the microprocessor in an idle state during a timeout period;
wherein the control unit includes a fetch unit for retrieving instructions to be executed which are stored in a program memory and a sequencer which receives the timeout signal and which delivers a blocking signal on an enable input for activating and deactivating the fetch unit so as to interrupt and block the retrieval of the instructions.

8. A microprocessor, comprising:
a computation unit which includes logic units for executing operations associated with instructions of a microprocessor instruction set;
a control unit for interpreting the instructions and for controlling the logic units accordingly; and
an internal timer which is activated by the control unit in response to the execution of a dedicated standby instruction of the microprocessor instruction set and which delivers a timeout signal to the control unit so as to place the computation unit of the microprocessor in an idle state during a timeout period;
wherein the control unit includes a decoding unit for decoding instructions to be executed and a sequencer which receives the timeout signal and which delivers a blocking signal on an enable input for activating and deactivating the decoding unit so as to interrupt and block the decoding of the instructions.

9. A microprocessor, comprising:
a computation unit which includes logic units for executing operations associated with instructions of a microprocessor instruction set;
a control unit for interpreting the instructions and for controlling the logic units accordingly; and an internal timer which is activated by the control unit in response to the execution of a dedicated standby instruction of the microprocessor instruction set and which delivers a timeout signal to the control unit so as to place the computation unit of the microprocessor in an idle state during a timeout period;

wherein the control unit includes an ordinal counter which stores the address of a future instruction to be executed and a sequencer which receives the timeout signal and which delivers a blocking signal on an enable input for activating and deactivating the counter so as to interrupt and block the address storage in the counter.

10. A method of managing a standby state of a microprocessor comprising a computation unit which includes arithmetic logic for executing operations associated with instructions belonging to a microprocessor instruction set and a control unit for interpreting the instructions and for controlling the arithmetic logic accordingly, the method comprising:

activating a timer, which is internal to the microprocessor, in response to the execution of a dedicated standby instruction of the microprocessor;

delivering a timeout signal to the control unit; and delivering a blocking signal to interrupt and block the processing of the instructions so as to place the arithmetic logic in an idle state during a timeout period;

wherein delivering the blocking signal comprises: the control unit comprises units for processing instructions including at least one fetch unit for retrieving from a program memory instructions to be executed and a sequencer which receives the timeout signal and which delivers the blocking signal, in response to the timeout signal, on an enable input for activating and deactivating said fetch unit so as to interrupt and block the retrieval of the instructions during the timeout period.

11. The method according to claim 10, further comprising an optional parameterization step wherein the timeout period is adjusted, the period being a value specified as parameter of the standby instruction.

12. The method according to claim 11, wherein the timeout period corresponds to a number of clock cycles.

13. A method of managing a standby state of a microprocessor comprising a computation unit which includes arithmetic logic for executing operations associated with instructions belonging to a microprocessor instruction set and a control unit for interpreting the instructions and for controlling the arithmetic logic accordingly, the method comprising:

activating a timer, which is internal to the microprocessor, in response to the execution of a dedicated standby instruction of the microprocessor;

delivering a timeout signal to the control unit; and delivering a blocking signal to interrupt and block the processing of the instructions so as to place the arithmetic logic in an idle state during a timeout period;

wherein the control unit comprises units for processing instructions including at least one decoding unit for decoding instructions to be executed and a sequencer which receives the timeout signal and which delivers the blocking signal, in response to the timeout signal, on an enable input for activating and deactivating said decoding unit so as to interrupt and block the retrieval of the instructions during the timeout period.

14. A method of managing a standby state of a microprocessor comprising a computation unit which includes arithmetic logic for executing operations associated with instructions belonging to a microprocessor instruction set and a control unit for interpreting the instructions and for controlling the arithmetic logic accordingly, the method comprising:

activating a timer, which is internal to the microprocessor, in response to the execution of a dedicated standby instruction of the microprocessor;

delivering a timeout signal to the control unit; and delivering a blocking signal to interrupt and block the processing of the instructions so as to place the arithmetic logic in an idle state during a timeout period;

wherein the control unit comprises units for processing instructions including at least one instruction register which stores instructions to be executed and a sequencer which receives the timeout signal and which delivers the blocking signal, in response to the timeout signal, on an enable input for activating and deactivating said instruction register so as to interrupt and block the storage of the instructions in said instruction register during the timeout period.

15. A method of managing a standby state of a microprocessor comprising a computation unit which includes arithmetic logic for executing operations associated with instructions belonging to a microprocessor instruction set and a control unit for interpreting the instructions and for controlling the arithmetic logic accordingly the method comprising:

activating a timer, which is internal to the microprocessor, in response to the execution of a dedicated standby instruction of the microprocessor;

delivering a timeout signal to the control unit; and delivering a blocking signal to interrupt and block the processing of the instructions so as to place the arithmetic logic in an idle state during a timeout period;

wherein the control unit comprises units for processing instructions including at least one ordinal counter which stores the address of the next instruction to be executed and a sequencer which receives the timeout signal and which delivers the blocking signal, in response to the timeout signal, on an enable input for activating and deactivating said counter so as to interrupt and block the address storage during the timeout period.

16. An apparatus, comprising:

a computation unit for a microprocessor;

a timer for counting a standby time period and activating during that period a time out signal;

a control unit responsive to execution of a standby instruction within an instruction set of the microprocessor to actuate the timer, and further responsive to the time out signal to interrupt and block processing of program instructions by the computation unit of the microprocessor;

wherein the control unit further includes a sequencer responsive to the standby instruction to actuate the timer, and further responsive to assertion of the time out signal to disable at least one other component from operation.

17. The apparatus of claim 16 wherein the control unit includes a fetch unit to fetch program instructions for execution from a memory only when the time out signal is not asserted.

18. The apparatus of claim 16 wherein the control unit includes a register storing an address in memory of a next instruction to be executed, the register supplying that address to the memory only when the time out signal is not asserted.

19. The apparatus of claim 16 wherein the control unit includes an instruction register that receives an instruction to be executed, the instruction register being enabled for operation only when the time out signal is not asserted.

20. The apparatus of claim 16 wherein the control unit includes a decoding unit that decodes an instruction to be executed, the decoding unit being enabled for operation only when the time out signal is not asserted.

21. The apparatus of claim 16 wherein the other component is a register storing an address in memory of a next instruction to be executed.

22. The apparatus of claim 16 wherein the other component is an instruction register that receives an instruction to be executed.

23. The apparatus of claim 16 wherein the other component is a decoding unit that decodes an instruction to be executed.

24. The apparatus of claim 16 wherein the other component is a fetch unit to fetch program instructions for execution.

* * * * *